United States Patent [19]

Schonlau et al.

[11] Patent Number: 4,750,791

[45] Date of Patent: Jun. 14, 1988

[54] PRESSURE CONTROL UNIT, DUAL-CIRCUIT BRAKE SYSTEMS

[75] Inventors: Juergen Schonlau, Walluf; Peter Volz, Darmstadt; Matthias Kaempfer, Dreieich, all of Fed. Rep. of Germany

[73] Assignee: Alfred Teves GmbH, Frankfurt am Main, Fed. Rep. of Germany

[21] Appl. No.: 35,743

[22] Filed: Apr. 8, 1987

[30] Foreign Application Priority Data

May 2, 1986 [DE] Fed. Rep. of Germany ....... 3614798

[51] Int. Cl.⁴ .......................... B60T 8/30; B60T 8/22; B60T 8/26; B60T 8/18

[52] U.S. Cl. .................................. 303/22.8; 188/195; 137/493.8

[58] Field of Search .................. 303/22 R, 22 A, 6 C, 303/6 R; 188/195, 349; 137/87, 505.18, 493.2, 493.9, 493, 493.4, 493.7, 493.8

[56] References Cited

U.S. PATENT DOCUMENTS

| | | | |
|---|---|---|---|
| 2,844,161 | 7/1958 | Ostwald | 188/349 X |
| 3,290,882 | 12/1966 | Oberthür | 303/6 C X |
| 3,449,018 | 6/1969 | Hales | 188/349 X |
| 3,467,440 | 9/1969 | Strien et al. | 303/6 C |
| 3,503,657 | 3/1970 | MacDuff | 303/6 C X |
| 3,623,776 | 11/1971 | Wellman | 303/6 C |
| 3,901,561 | 8/1975 | Seip | 303/6 C X |
| 3,904,253 | 9/1975 | Riquart | 303/22 R |
| 3,945,688 | 3/1976 | Farr | 303/22 R |
| 4,615,566 | 10/1986 | Perrin | 303/6 C |

FOREIGN PATENT DOCUMENTS

| | | | |
|---|---|---|---|
| 2329148 | 1/1974 | Fed. Rep. of Germany . | |
| 2706785 | 9/1977 | Fed. Rep. of Germany . | |
| 3026560 | 2/1982 | Fed. Rep. of Germany . | |
| 3343614 | 6/1985 | Fed. Rep. of Germany | 303/22 R |
| 3431813 | 3/1986 | Fed. Rep. of Germany . | |
| 1192829 | 5/1970 | United Kingdom . | |
| 1263521 | 2/1972 | United Kingdom . | |
| 2042134 | 9/1980 | United Kingdom . | |

*Primary Examiner*—Douglas C. Butler
*Attorney, Agent, or Firm*—James B. Raden; Robert P. Seitter

[57] ABSTRACT

A pressure control unit comprises a housing and a regulating device connected between an inlet and an outlet thereof and actuated by a control force. To accomplish low-priced manufacture, great reliability of function and valve-tightness, it is arranged so that the control piston is of bipartite design and includes an integrated valve seat.

3 Claims, 2 Drawing Sheets

20 6 19 40 54
29
50 52 48

16
27
36
26
11
22
25
7
6
19
12
21
1
5
17
29
32
8
18
24
23
20

6
19
29
20
46
42

20
6
19
40
54
29
50
52
48

PRESSURE CONTROL UNIT, DUAL-CIRCUIT BRAKE SYSTEMS

The present invention relates to a pressure control unit, in particular for pressure-fluid-actuatable dual-circuit brake systems of automotive vehicles.

Pressure control units of this type serve to reduce the braking pressure in the rear-axle brake circuit of a vehicle in relation to the pressure prevailing at the front-wheel brakes. To optimally adapt the brake behavior - under various load conditions of a vehicle and in consideration of the dynamic axle load distribution during the braking operation—to the brake behavior characterized by the ideal braking pressure characteristic curve, load-responsive pressure control units are provided. These control units are arranged so that there is variation of the change-over pressure on attainment of which pressure reduction commences.

A pressure control unit according to the species is known from German published patent application No. 33 43 614. It is of complicated design and, accordingly, is difficult to mount. Moreover, this known pressure control unit comprises a valve seat which is punched pressure-tightly in the control piston and is designed as an additional annular piece part. This disclosed type of construction does not allow for use of an element such as a stamped ball as both a sealing member or valve closure member in the control unit. Use of such an element is desirable because of the good values of seal-tightness obtained.

SUMMARY OF THE INVENTION

Therefore, it is an object of the present invention to provide a pressure control unit according to the species which is characterized by a low-price and simple manufacture, by great reliability of function and by particular tightness of the valves.

This object is achieved according to this invention by providing a pressure control unit including a housing having an inlet, an outlet and a regulating device therebetween. The regulating device includes a control piston of bipartite design. The piston includes a first portion projecting from the housing and a second portion entirely within the housing. The second portion is provided with an integrated valve seat.

It is of special advantage in respect of corrosion prevention that the control piston is of bipartite design. The coupling portion protruding from the housing can be made of high-quality steel, while the control portion may consist of steel and include an integrated valve seat. This integrated valve seat obviates the need for a turned piece which must be caulked pressure-tightly to be used as a valve seat.

A special benefit for the manufacturing costs is that an element of a most simple geometrical configuration, in particular a ball, may be used as a sealing member or valve closure member. The ball is inserted into a corresponding recess prior to connecting the coupling portion to the control portion and serves both for stamping the valve seat and as a sealing member.

It is of special advantage that the valve-actuating pin is acted upon by a resilient component such as a spring or a rubber element. This minimizes the variation (hysteresis) of the pressure-increase characteristic curve from the pressure-decrease characteristic curve of the pressure control unit.

It is also expedient for the reliability of operation that a filter element be fitted into the pressure control unit. This is preferably accomplished by having the filter element clamped between a closure member and an annular disc. The filter element is preferably composed of a stable material containing pores and is disposed in front of an inlet bore, as pressure control units are particularly susceptible to dirt.

Another advantage is to be seen in a head-like expansion at one end of the valve-actuating pin which actuates the valve closure member. The expansion acts to axially secure the valve-actuating pin in position together with a plastic member pressed on the other end.

It is particularly advantageous that the coupling portion, which is made of high-quality steel, needs to undergo only minor mechanical treatment.

Another major advantage is that the regulating device can be entirely pre-assembled and then screwed into its bore as a whole. During the screw-in action, the packing ring seated on the control portion is urged by a helical spring and the disc to assume its proper position.

BRIEF DESCRIPTION OF THE DRAWING

Further favorable features can be gathered from the following description of preferred embodiments of this invention.

In the drawings.

Like parts have been assigned like reference numerals in all illustrations.

DETAILED DESCRIPTION OF A PREFERRED EMBODIMENTS

Figure 1:
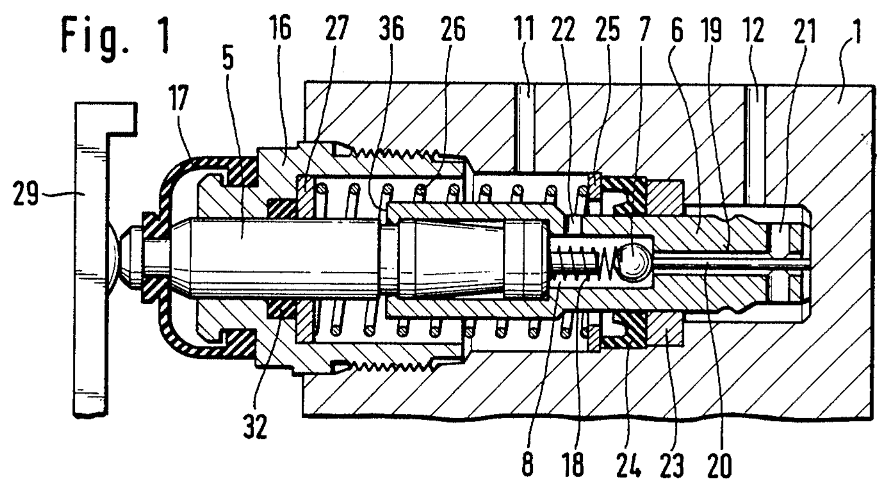
FIG. 1 is a cross-section through one embodiment of a pressure control unit, in accordance with this invention.

The pressure control unit illustrated in FIG. 1 includes a housing 1 incorporating a stepped main bore for the regulating device which is substantially composed of the coupling portion 5 and the control portion 6. Besides, there is provision of connecting bores for an inlet 11 and an outlet 12 (both formed in the housing) of the rear-axle brake circuit. The inlet 11 and outlet 12 extend transversely to the main bores.

Since it gets into contact with the atmosphere, the substantially cylinder-shaped coupling portion 5 of the regulating device is made of stainless steel. It projects into the stepped sleeve-shaped control portion 6 of larger external diameter, with which it is caulked, and is sealingly supported in a closure member 16 that is pressure-tightly screwed to the housing 1. One end of a protective cup 17 engages over the closure member 16, while the other end thereof is secured in an annular groove formed in the end portion of the coupling portion 5 where it projects out of the housing 1. A ball 7 is contained in a recess (reduced diameter bore portion) 8 of the control portion 6. The ball 6 has a valve seat stamped on it and is caused by a spring 18 to move into abutment on the inner end of an axial bore 19 formed in the control portion. A pin 20 is inserted with play into the bore 19. Vertically (as shown in the drawing) to said bore 19 there is formed a cross bore 21 that communicates with the bore 19 and the outlet 12.

At its other end, the spring 18 bears against the end of coupling portion 5 and is guided by a pin formed on the corresponding end for this purpose. The recess 8 is in communication with the connecting bore 11 via a cross bore 22 and the main bore of the housing 1. The control portion 6 is accommodated slidably in a ring 23 and is sealed relative to the housing 1 by a packing ring 24. Abutting on the outward sealing lip of the packing ring 24 is an annular disc 25 which is acted upon by a spring 26 whose other end bears on a ring 27 which, in turn, bears against the closure member 16.

The internal diameter of ring 27 is less than the external diameter of the control portion 6 so that the ring acts as a stop for the end surface 36 of the control portion 6. As a result, the ring 27 serves as a return stroke limiter for the regulating device. Ring 27 also serves to secure a seal 32 between the coupling portion 5 and the closure member 16.

A load-responsive control force is applied to the regulating device by a lever 29 onto which the control force is introduced by a preloaded (non-illustrated) spring. The coupling and control portions 5 and 6, respectively, displace in opposition to the actuating force upon attainment of the change-over pressure during a brake operation so that the ball 7 which was previously retained in the opened position by the pin 20 closes the bore 19. Upon further rise of the pressure introduced through the bore 11, the outlet pressure in the bore 12 will be reduced according to the ratio of the pressure-applied surfaces of the control portion 6 and the coupling portion 5.

When the inlet pressure is decreased, the pressure drop at the outlet side will first be performed in opposition to the actuating force due to the pressure difference. Further pressure reduction will take place in dependence on the actuating force by the packing ring 24 being overflown by fluid and by the valve seat opening due to actuation of the ball 7 by the pin 20 after the regulating device is in abutment on the housing 1.

Figure 2:
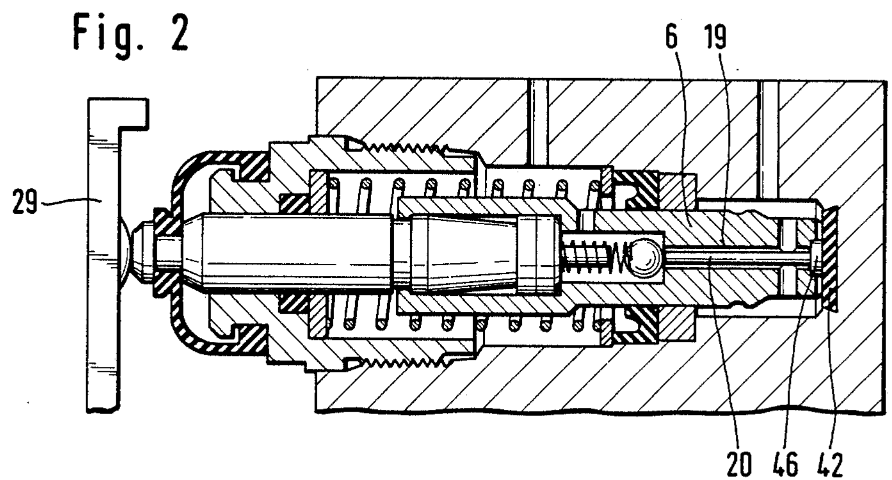
FIG. 2 is a cross-section through another embodiment of the invention with a rubber element between the pin and housing.
Figure 3:
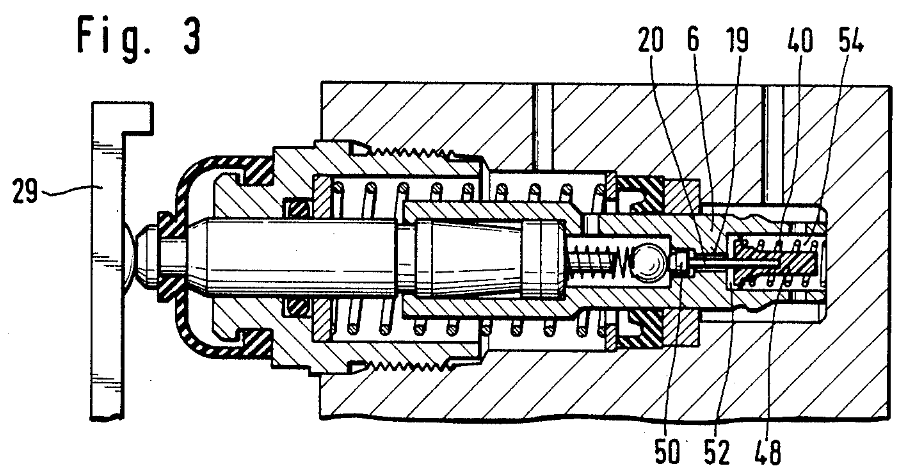
FIG. 3 is a cross-section through another embodiment of the invention with a spring between the pin and housing.

FIGS. 2 and 3 each represent one embodiment of the invention having a resilient component part between the pin 20 and the housing 1. In FIG. 2, this component part is as rubber element 42 which is inserted into a corresponding recess of the housing 1 at the end of the bore for the regulating device.

The shape of the rubber element 42 and of the recess is like a truncated cone tapered towards the housing inner side. Thus, the rubber element 42 is axially secured in position after it has been pressed into the recess and has engaged therewith. At its end adjacent the rubber element, the pin 20 has an expanded head 46 for which, too, a recess is provided at the corresponding end of the control portion 6. The recess in the control portion 6 is dimensioned such that the head 46 projects somewhat beyond the end of the control portion.

Figure 5:
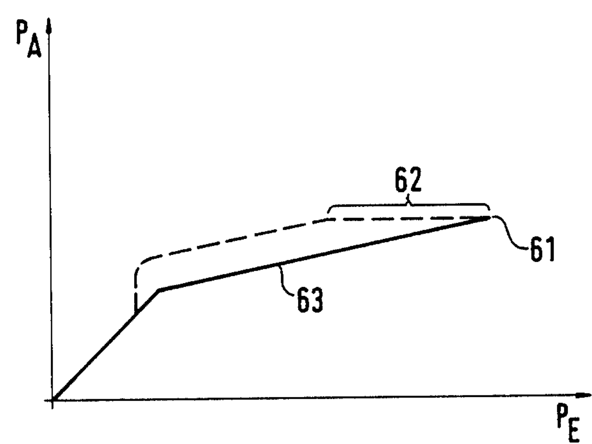

The effect the control force has on the pin 20 leads to a faster opening of the control valve on termination of the brake application—see in this respect point 61 in FIG. 5 displaying the graph of the outlet pressure $P_A$ prevailing at bore 12 in excess of the inlet pressure $P_E$ at bore 11. The force of the valve ball 7, which in addition has to be received by the control portion 6, is led into the control portion 6 and covers a distance of roughly 1 to 2 mms. This shortens the distance 62 which otherwise, depending on the magnitude of $P_E$, may amount up to 15 bar, and decreases the range of hysteresis, that means the area between the pressure-increase characteristic curve 63 and the decrease characteristic curve drawn in dash-dot lines. Hence, this range which is important for a stable driving behavior is characterized by very little deviation from the pressure-increase characteristic curve 63.

FIG. 3 shows an embodiment of the invention for decreasing the hysteresis effect, wherein a helical spring 40, as an elastic element, serves to preload the pin 20. To this effect, a round plastic member 48, T-shaped in longitudinal cross-section, is pressed onto the end of the pin 20 adjacent the end wall of the housing 1. The other end of the pin facing the ball is formed with a portion 50 of enlarged diameter which is guided in an enlarged part of the bore 19. In conjunction with the plastic member 48, this creates an axial securing-in-position of the pin 20.

In its area of larger diameter adjacent the ball 7, the plastic member 48 contains flow channels 52 through which the bore 19 communicates with the recess 54 in which the plastic member 48 is guided. The end face of the recess 54 forms a stop for the plastic member 48. Engaging at the back side of the enlarged portion of the plastic member 48 adjacent the stop is the helical spring 40, the other end of which bears against the housing 1.

Figure 4:
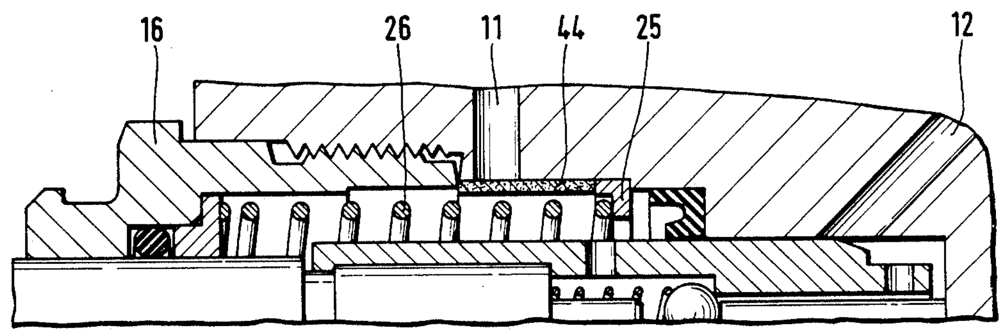
FIG. 4 is a partial cross-section through another embodiment of the invention with a filter element; and, FIG. 5 is a graph showing the variation of the outlet pressure above the inlet pressure.

In FIG. 4, a filter 44 is fitted into the bore for the regulating device. The filter 44 is an annular member and is made of a still material. It is mounted prior to the closure member 16 being screwed in and is clamped in between the latter and the annular disc 25 so as to tightly abut the bore of the regulating device, directly in front of the bore 11 through which the pressure fluid is propagating. This way, the filter 44 is penetrated by fluid from two directions what has a self-cleaning effect. The filter 44 can be cut to proper size from a tube made of filtering tissue, what renders the manufacture inexpensive.

It will now be appreciated that the mode of operation of the device of FIGS. 1–4 is as follows. Initially the control valve is open because the control force applied by lever 29 translates control piston 6 so that pin 20 projects through bore 19 and lifts ball 7 away from its valve seat. Upon a braking operation and the attainment of change-over pressure, control piston 6 translates away from pin 20 so that ball 7 which was previously retained in the opended position by the pin 20 closes the bore. This then reduces the braking pressure in the rear-axle brake circuit in relation to the pressure at the front-wheel brakes.

What is claimed is:

1. A load-responsive pressure control unit for a dual-circuit brake system of an automotive vehicle having wheel brakes and a master cylinder for applying braking pressure to said brakes, said control unit comprising, in combination:

- a housing having an inlet and an outlet, said inlet being connectable to said master cylinder and said outlet being connectable to at least one wheel brake;
- a regulating device in said housing connected between said inlet and said outlet, said regulating device comprising a control piston having a coupling portion slidably mounted and extending into said housing and a first end of which extends outwardly of said housing for engaging a yieldable load-responsive member located externally of said housing, wherein a predetermined pressure at said inlet translates said coupling portion of said control piston away from said housing and against said member, and wherein the other end of said coupling portion is connected to a control portion of said control piston in said housing for translation therewith, said control portion having a passageway therein extending between and connecting said inlet and said outlet within said housing, said passageway having a reduced bore extending therein, said reduced bore loosely retaining a pin therein, said passageway opening into an enlarged recess adjacent said inlet at one end of said reduced bore, said recess having a ball valve member therein which is resiliently urged into engagement with said one end of said bore to close said bore until translation of said control piston into said housing and over said pin forces said ball against one end of said pin which translates said ball into said recess and away from said one end of said bore to open the passageway between said inlet and said oulet; and, wherein said passageway includes a second enlarged recess adjacent said outlet at the other end of said bore, said second recess including a flexible member attached to the other end of said pin and wherein said flexible member is resiliently urged toward said ball valve member.

2. The control unit according to claim 1, wherein the end of said bore adjacent said ball valve member includes a recess for receiving an enlarged head portion of said pin.

3. The control unit according to claim 2, wherein said flexible member is a plastic member which is urged toward said ball valve member by a helical spring which engages an end portion of said housing.

* * * * *